Dec. 7, 1943.  P. J. VOGEL  2,336,139

HOSE CLAMP

Filed April 13, 1943

Inventor
Philip J. Vogel,

Attorneys

Patented Dec. 7, 1943

2,336,139

UNITED STATES PATENT OFFICE 2,336,139

HOSE CLAMP

Philip J. Vogel, St. Louis, Mo.

Application April 13, 1943, Serial No. 482,921

1 Claim. (Cl. 24—19)

This invention relates to a hose clamp and is especially adaptable for securing a fitting within a flexible hose or the latter on a pipe or like device.

The primary object of this invention is the provision of a device of the stated character which may be readily installed without the use of special tools and eliminates the employment of separable and detachable fasteners for its installation and maintenance in place and when applied will have a complete restrictive action on the hose and the member to which it is applied, the restrictive action extending for the full circumference of the hose to eliminate any chance of leakage occurring between the hose and the device to which it is applied.

Another object of this invention is the provision of a device of the above stated character which greatly reduces manufacturing cost and permits production to be greatly increased and reduces storage space to a minimum prior to use and provides a large reduction in inventory as each device may be made to have a number of sizes to permit its application to hose having various sizes or external diameters.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a clamp constructed in accordance with my invention, and showing the same applied to a hose which is adapted to a fitting.

Figure 1:
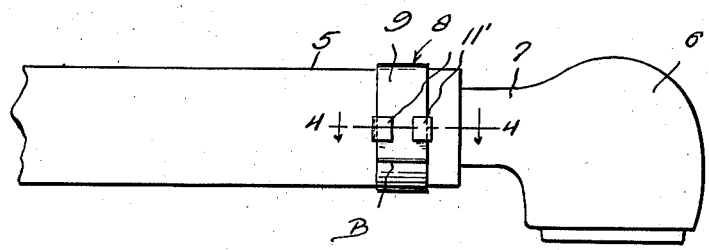

Referring in detail to the drawing, the numeral 5 indicates a fragmentary portion of a flexible hose, 6 a fitting adapted to the hose. In the application of the fitting to the hose, one end of the hose is brought over a shank 7 of the fitting and in order to prevent leakage between the hose and the fitting the present invention is applied to the hose adjacent said end for tightly clamping the hose on the shank of the fitting.

The clamp constituting the present invention is indicated in entirety by the character 8 and includes a substantially annular band-like portion 9 and end tensioning portions 10 and 11 adapted to have interlocking connection with each other and held in interlocked position by ears 11'. The clamp 8 is constructed from flexible sheet metal and the construction thereof can be economically carried out by a stamping operation, the blank of the clamp being indicated in Figure 5. The blank is in the form of an elongated metallic strip, the width of which is considerably greater than the thickness and a pair of extensions opposed to each other which form the ears 11'. The extensions are arranged adjacent one end of the metallic strip and between said ends and said extensions the metallic strip is scored as shown at 12. The scoring of the metallic strip as indicated at 12 is transversely of said strip and the latter is also provided with a plurality of spaced scores, as shown at 13, also extending transversely of the strip and adjacent the other end thereof.

Figure 2:
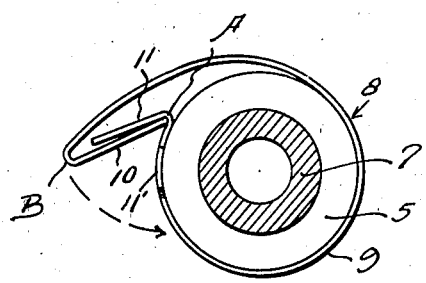
Figure 2 is a transverse sectional view showing the position assumed by the clamp on the hose prior to its complete application to said hose.
Figure 3:
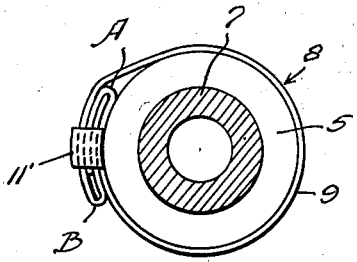
Figure 3 is a view similar to Figure 2 showing the clamp completely applied.
Figure 5:
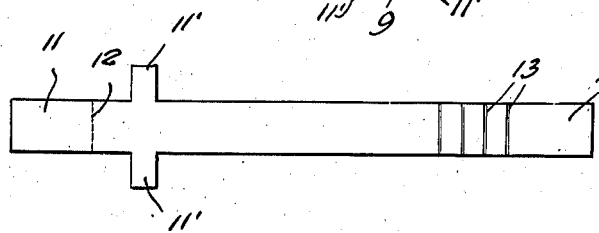
Figure 5 is a plan view illustrating the clamp in blank form prior to being brought in shape for application on the hose.

In the initial forming of the clamp 8 from the blank, as shown in Figure 5, the blank is bent on the scored line 12 and one of the score lines 13 and also is bent between said score lines into substantially annular formation causing the blank to take on a position substantially as shown in Figure 2 with the end portions 10 and 11 in overlapped relation. The annular portion is then in an expanded position and can be readily placed over the hose prior to the application of the fitting to the hose. After the clamp has been brought into proper position on the hose, the fitting is inserted in the hose so that the shank 7 extends beyond the annular portion of the clamp.

The bending of the metallic strip of the blank on the score lines as mentioned, forms the portions 10 and 11 as well as seats designated by the characters A and B. These seats are formed for the purpose of being engaged by the free ends of the end portions 10 and 11. However, it is to be noted that the free end of the end portion 10 engages with the seat A when the device is in the position as shown in Figure 2, so that a pressure placed on the metallic strip adjacent the seat B and in the direction of the hose as indicated by the arrow in Figure 2 brings about a contraction of the annular portion of the clamp on the hose and is held in this position until the extensions forming the ears 11' are bent to overlie the annular portion as well as the end portions 10 and 11. Both end portions at this time become engaged with their seats.

Figure 4:
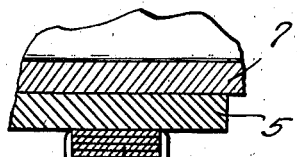
Figure 4 is a transverse sectional view taken on the line 4—4 of Figure 1.

The ears 11' bent to engage the portions of the clamp as specified and as shown in Figure 4 will retain the clamp in a contracted position on the hose thereby tightly squeezing the hose substantially throughout its entire circumference on the shank of the fitting to prevent leakage between the hose and the fitting.

From the foregoing it will be seen that the entire application and securing of the clamp on the hose can be easily carried out by anyone employing any type of tool, such as pliers or the like. The size of the annular portion is governed entirely by which score line 13 the metallic strip is bent on. Thus it will be seen that a single blank may be formed into a clamp to fit hose of different sizes. This, naturally, reduced inventory and further it will be seen that the blank of the clamp being made from sheet metal with a stamping operation materially reduces manufacturing cost.

It will be noted that when the clamp is fully applied it will be free from undesirable protrusions and will lie flatly and present a substantially level surface on the hose.

While I have shown and described the preferred embodiment of my invention, it will be understood that minor changes in construction, combination and arrangement of parts may be made without departing from the spirit and scope of the invention as claimed.

Having thus described my invention, what I claim is:

In an adjustable hose clamp, an elongated flexible metallic strip having the major portion thereof bent into substantially annular formation to loosely receive a hose and provided with a score line adjacent one end and bent thereon to provide an angularly disposed end portion and a fulcrum seat, said strip having a group of spaced score lines extending transversely thereof and being bent on any one of the second mentioned score lines to form a second end portion variable as to length and receiving between itself and a portion of the substantially annular portion the other end portion and engaging said seat for pivoting in the direction of and against the substantially annular portion for tightening the annular portion on the hose, and bendable ears formed on the strip adjacent the first-mentioned score line and bent in the direction of each other to overlie and grip the substantially annular portion and securing the end portions in engagement with each other and bearing against the substantially annular portion to prevent expansion of said annular portion on the hose.

PHILIP J. VOGEL.